(12) United States Patent  
Sprokkereef

(10) Patent No.: US 7,424,104 B2
(45) Date of Patent: Sep. 9, 2008

(54) CALL DETAIL RECORD FOR INTERNET CALL WAITING

(75) Inventor: Ronald Sprokkereef, Heemstede (NL)

(73) Assignee: Koninklijke KPN N.V., The Hague (NL)

( * ) Notice: Subject to any disclaimer, the term of this patent is extended or adjusted under 35 U.S.C. 154(b) by 165 days.

(21) Appl. No.: 10/578,210

(22) PCT Filed: Nov. 12, 2004

(86) PCT No.: PCT/EP2004/012955

§ 371 (c)(1),
(2), (4) Date: May 4, 2006

(87) PCT Pub. No.: WO2005/055575

PCT Pub. Date: Jun. 16, 2005

(65) Prior Publication Data

US 2007/0116232 A1    May 24, 2007

(30) Foreign Application Priority Data

Nov. 28, 2003   (EP)   .................................. 03078765

(51) Int. Cl.
*H04M 15/00*   (2006.01)
(52) U.S. Cl. ................... 379/133; 379/112.01; 379/135
(58) Field of Classification Search ............ 379/114.01, 379/114.03, 114.28, 115.01, 126, 133, 142.08, 379/142.16, 215.01, 112.01, 112.06, 134, 379/139; 370/259, 352
See application file for complete search history.

(56) References Cited

U.S. PATENT DOCUMENTS 6,144,644 A * 11/2000 Bajzath et al. .............. 370/259

(Continued)

FOREIGN PATENT DOCUMENTS

WO   WO 00/74431   12/2000

OTHER PUBLICATIONS

"XACCT Solutions for IP Telephony, Profiting From the IP Revolution", Jun. 2001, pp. 1-20, http://www.xacct.com/documents/ip_telephony_white_paper.pdf.

(Continued)

*Primary Examiner*—Quoc D Tran
(74) *Attorney, Agent, or Firm*—Michaelson & Associates; Peter L. Michaelson

(57) ABSTRACT

A method, and a device are disclosed for logging management information during a call completion process in an Internet call-waiting environment The logging of information is performed by an ICW application server (4) that is connected to an ICW web server (3). The ICW application server (4) may also handle provisioning-requests coming from the ICW web server (3), may offer tools used by a helpdesk and the operational maintenance, may store user-profiles of ICW users, may play a role during the execution of the ICW service. During the execution of the ICW service the ICW application server (4) can communicate to an ICW client (10). The ICW application server (4) may also comprise an interface for accessing, by humans or devices, the information that is logged. The disclosed method for the logging of information comprises the creation of a service detail record (200) that comprises parameters. Values can be assigned to the parameters during the provisioning and/or the execution of the ICW service. A parameter can be related to information about the call to be completed, or to information about the call completion process.

13 Claims, 3 Drawing Sheets

U.S. PATENT DOCUMENTS 6,661,785 B1 * 12/2003 Zhang et al. ................ 370/352
2004/0218583 A1 * 11/2004 Adan et al. ................ 370/352

OTHER PUBLICATIONS

D.E. Dodds et al, "Simultaneous Voice and Internet Data on Rural Subscriber Lines", Communications, Computers and Signal Processing, 1999 IEEE Pacific Rim Conference on Victoria, BC, Canada, Aug. 22-24, 1999, pp. 18-21.

X. Zhu et al, "IIN model: modifications and case study", Computer Networks, Elsevier Science Publishers B.V., vol. 35, No. 5, Apr. 2001, pp. 507-519.

* cited by examiner

CALL DETAIL RECORD FOR INTERNET CALL WAITING

FIELD OF THE INVENTION

The present invention relates to a method for logging call completion information in an Internet call waiting environment.

BACKGROUND OF THE INVENTION

The present invention deals with fixed and mobile telephony systems, and with Internet related systems and networks. In this context, Internet users having only one telephone connection are not able to answer incoming telephone calls while being on-line via Internet. A possible system to notify Internet users during an active Internet session about an incoming telephone call is known from PCT Application No. WO 99/14924. According to this known method it is possible to set up an IP call. However, this known method does not include the logging of management information during the set up procedure. As a consequence, the provider of the Internet Call Waiting (ICW) service has not available management information concerning the provisioning and execution of the ICW service on which accounting-, fault- and performance management activities, e.g. for improving the service levels, can be based. This type of management information is not only useful in the case of IP calls to be set up. Also for other types of calls to be set up, such as PSTN calls, the management information is useful for the service provider. Also for situations where the call set up procedure fails, it is desirable for the ICW service provider to have available management information.

AIM OF THE INVENTION

It is an object of the invention to eliminate the drawbacks of the prior art and to provide a method for the logging of management information during the call completion process in an Internet call waiting environment.

SUMMARY OF THE INVENTION

The process of completing a call in an Internet call waiting environment requires significantly more steps than the 'normal' call completion process. Also, in an Internet call waiting environment the steps are more complex, and there are more entities interoperating together to provide the Internet call waiting service. Therefore, a service provider would like to have available information about the performance of the Internet call waiting service. A drawback of the prior art is that there is no logging of information relating to the providing and the execution of the ICW service.

The method according to the invention eliminates the drawbacks of the prior art and comprises logging the events relating to the providing and the execution of the ICW service. In an embodiment of the present invention the method comprises the creation by an ICW application server of a service detail record that comprises parameters. The parameters of the service detail record can be assigned a value during the call completion process in order to log information relating to the call completion process. Another aspect of the method that is comprised by the embodiment is to make use of timers for controlling the process of call completion and to base information logging on. The service detail record relates to a call completion instance and can comprise every kind of information that is relevant for a specific call completion procedure. The present invention is not limited to situations where a call is established between a calling party and a called party. Also for cases where there is no call established (e.g. the call is routed to a voice mail server), according to the present invention management information can be logged.

An ICW application server is connected to a ICW web server. The ICW application server may handle provisioning-requests coming from the ICW web server, may offer tools used by a helpdesk and the operational maintenance, may store user-profiles of ICW users, may play a role during the execution of the ICW service, and may log information relating to the execution of the ICW service. The ICW application server communicates to an ICW client that resides at the equipment of the ICW user. The equipment of the user can be mobile or fixed access equipment, such as a personal computer or a GSM mobile phone. Devices in which different technologies, such as UMTS, IP, GSM, GPRS, Bluetooth and XML are combined or integrated are not excluded in the present invention.

The ICW application server can be a computer program running on a computer device. In the present invention there are no restrictions related to the operating system or any other aspect relevant to the computer device hosting the ICW application server. The ICW application server can be any type of computer program and is not restricted to IP related protocols and technology. In daily practice, the word server may not only mean a computer program but also a computer device comprising hardware and software. In the present invention neither one of these meanings is excluded. The ICW application server may be a computer program, but may also be a system comprising hardware and software. During the provisioning and execution of the ICW service and during the information logging process the ICW application server can communicate to other entities in the ICW environment. This communication can be via any type of network or communication channel including signaling protocols.

In accordance of this invention, a method is disclosed for logging information during a call completion procedure in an Internet call waiting environment. For this purpose, the method according to the present invention comprises the steps of:

creating a service detail record (200), and assigning a value to a parameter of the service detail record (200).

These steps of the method enable service providers to have available management information that is logged during the process of completing a call between a calling party and a called party.

Another aspect of the present invention is that the ICW application server makes use of an ICW user record that comprises information relating to a specific ICW user.

BRIEF DESCRIPTION OF THE DRAWING FIGURE

The foregoing aspects and many of attendant advantages of this invention will become better understood by reference to the following detailed description, when taken in conjunction with the accompanying drawing, wherein.

Figure 3:
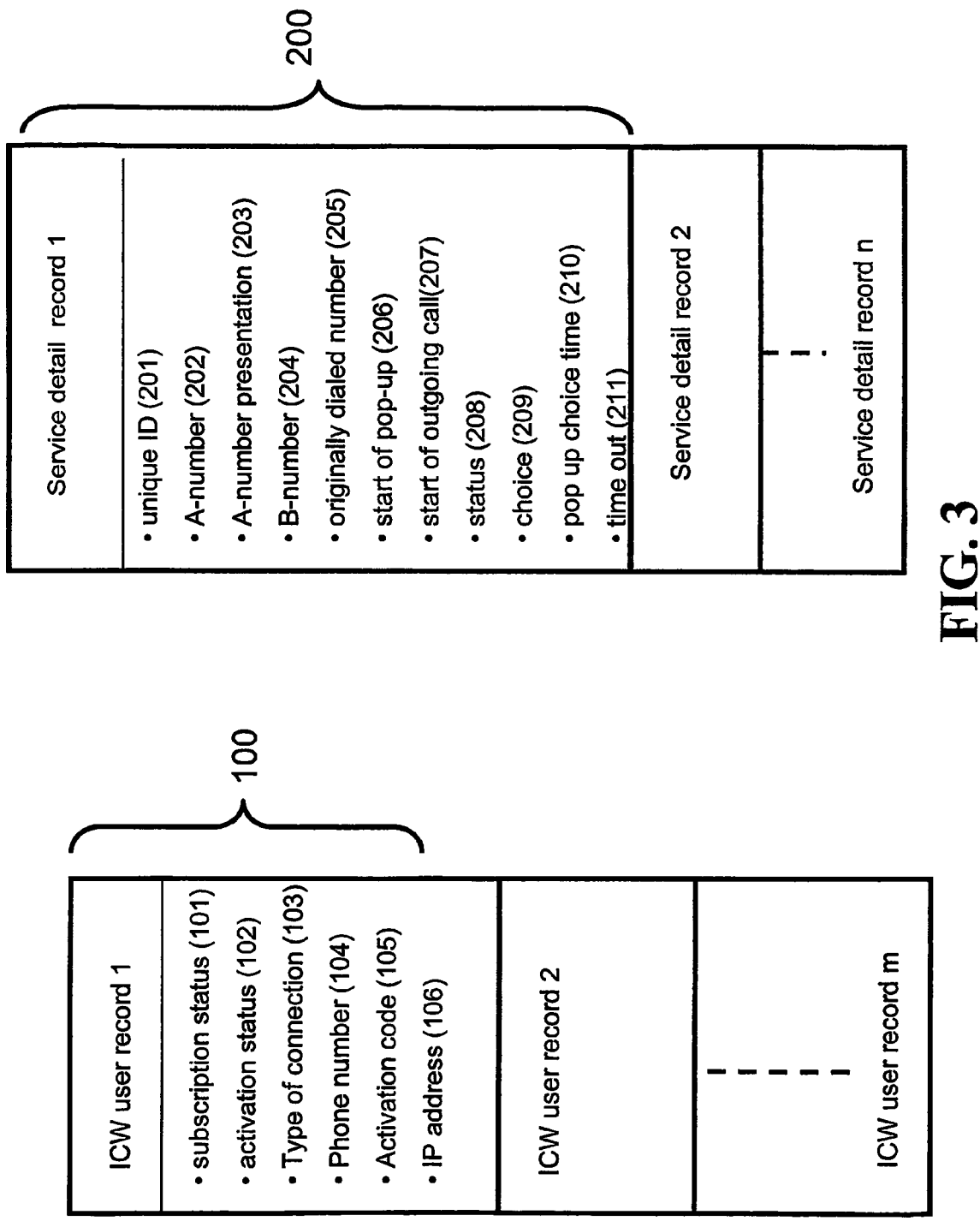

In FIG. 3 the structure of the ICW user record and the service detail record are depicted.

EXEMPLARY EMBODIMENTS

For the purpose of teaching of the invention, preferred embodiments of the method and devices of the invention are described in the sequel. It will be apparent to the person skilled in the art that other alternative and equivalent embodiments of the invention can be conceived and reduced to practice without departing form the true spirit of the invention, the scope of the invention being limited only by the appended claims as finally granted.

Figure 1:
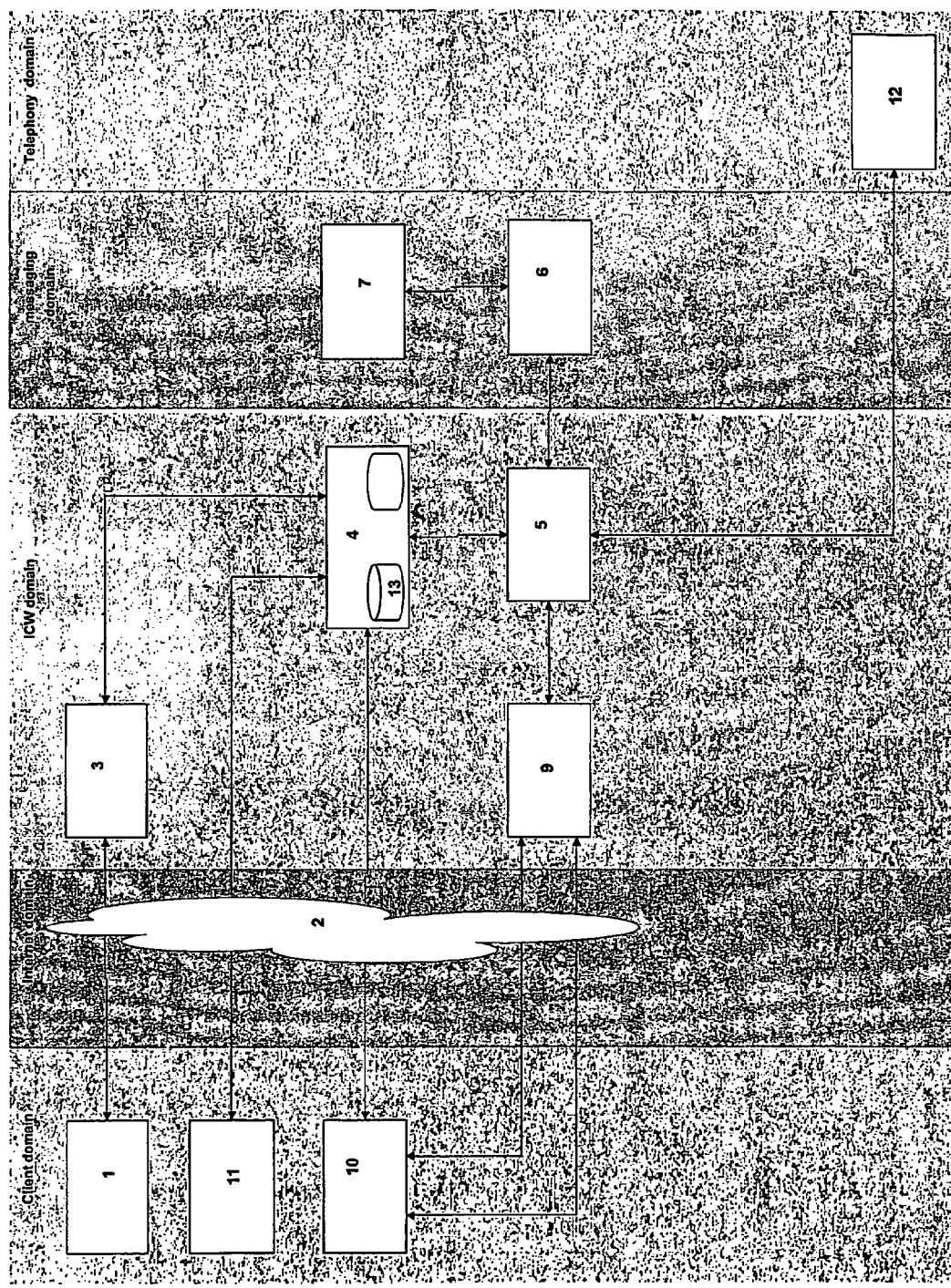
FIG. 1 is a conceptual block diagram illustrating an Internet call waiting environment in which the ICW application server is situated.

FIG. 1 shows a conceptual overview of an Internet call waiting environment. Referring to FIG. 1 there is a web browser (1) that resides on the equipment of the ICW user, such as a personal computer or a mobile telephone. The web browser (1) can be used for accessing Internet content and applications via an Internet or IP related network (2), but also for activating the ICW service via an ICW web server (3). The web browser (1) is not limited to HTML based browsers, but can be any type of graphical user-interface such as a XML based browser. The Internet or IP related network (2) is not necessarily a public network, but may also be a private network. Also, the Internet or IP related network (2) is not necessarily a fixed network but may also be a network based on mobile technology, such as GSM, GPRS and UMTS. The ICW web server (3) is the portal for the ICW provisioning and execution process, and can be based on HTML although other technologies or standards may be the basis for the ICW web server (3). The ICW web server (3) provides a web interface for signing up for the ICW service, for downloading ICW software and for looking up information about the service.

An ICW application server (4) is connected to the ICW web server (3). The ICW application server (4) may handle provisioning-requests coming from the ICW web server (3), may offer tools used by a helpdesk and the operational maintenance, may store user-profiles of ICW users, may play a role during the execution of the ICW service, and may log information relating to the execution of the ICW service. The ICW application server (4) may also comprise an interface for accessing, by humans or devices, the information that is logged. The ICW application server (4) is responsible for the interaction with an ICW-client (10) during the activation-process and the execution of the ICW service. The ICW application server (4) can be a computer program running on a computer device. In the present invention there are no restrictions related to the operating system or any other aspect relevant to the computer device hosting the ICW application server (4). The ICW application server (4) can be any type of computer program and is not restricted to IP related protocols and technology. In daily practice, the word server may not only mean a computer program but also a computer device comprising hardware and software. In the present invention neither one of these meanings is excluded. The ICW application server (4) may be a computer program, but may also be a system comprising hardware and software. Further, every type of communication protocol may be supported by the application server (4), such as ISDN, ATM, IP, GSM, UMTS, and signaling protocols like SS No. 7.

The ICW client (10) is a software application on the ICW user's equipment, necessary to use the ICW service. The ICW client (10) may or may not be on the same equipment as the web browser (1). The ICW client (10) comprises VoIP functionality that takes care of answering an inbound call offered from a VoIP Server (9). The ICW client (10) can be downloaded from the ICW web server (3) and can be installed by the ICW user on his equipment. ICW user-dependent service settings can be configured in the ICW Client (10). The VoIP server (9) takes care of rerouting the call to the equipment of the ICW-user. The VoIP server (9) may comprise a VoIP gateway and a SIP-Proxy necessary to map the telephone number of an ICW user to their IP-address.

Further, there is a switch (5) connected to the ICW applications server (4). The switch (5) is also connected to the VoIP server (9), to a messaging switch (6) and to another switch (12) in the telephony domain. The telephony domain may be fixed, such as PSTN or ISDN, or mobile or a combination of fixed and mobile. A possible functionality of the switch (5) is to take care of rerouting incoming calls to a new destination, as a result of the ICW-service. The messaging switch (6) can be used for the handling of voice mail messages, and is connected to a voice mail system (7).

Figure 2:
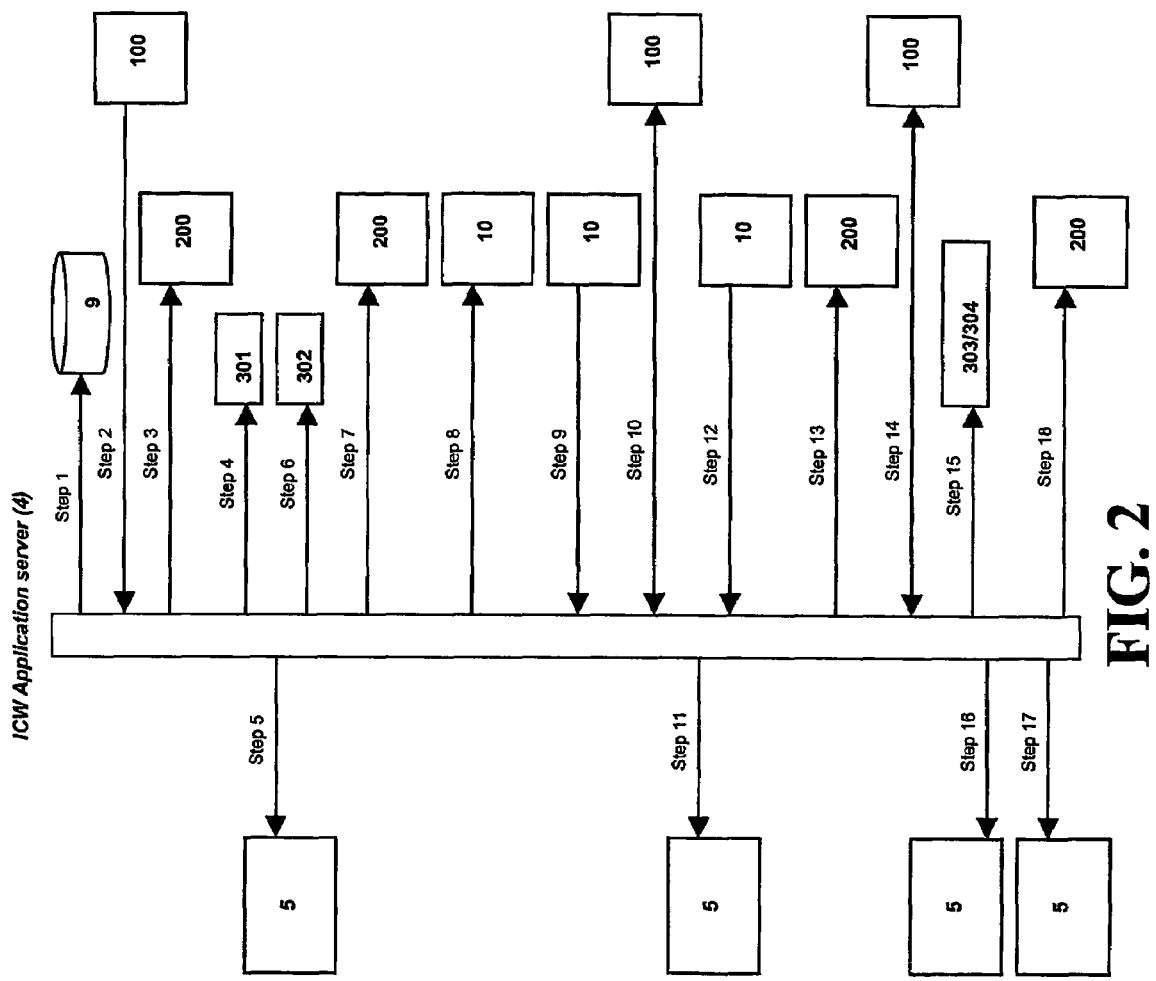
FIG. 2 is illustrating a call completion scenario during which management information is logged.

In FIG. 2 a procedure is depicted for the process of routing an incoming call to a destination (e.g. the telephone number of the ICW user), while that destination is busy because of an active Internet session. In this embodiment of the procedure the ICW user chooses to accept the incoming call and to route the incoming call to his telephone number. The procedure starts at the moment that the incoming call has been forwarded via the telephony network to the switch (5), and the switch (5) sends a trigger, such as an INAP trigger, to the ICW application server (4). The trigger from the switch (5) comprises a request to set up a call.

In FIG. 2, the steps of the procedure are depicted. During the procedure the ICW application server makes use of a ICW user record (100) for a specific ICW user. The The ICW user record (100) is depicted in FIG. 3, and comprises parameters relating to a specific ICW user, i.e. a subscription status (101), an activation status (102), a type of connection (103), a phone number (104), an activation code (105), and an IP address (106). The ICW application server (4) also can make use of a service detail record (200). The service detail record (200) comprises information about the ICW service that is provided to the ICW user. The service detail record (200) also can comprise information that can be used advantageously for account management, performance management and fault management purposes later by the ICW service provider. The service detail record (200) comprises the following parameters: unique ID (201), A-number, (202), A-number presentation (203), B-number (204), originally dialed number (205), start of pop-up (206), start of outgoing call (207), status (208), choice (209), popup choice time (210), and timeout (211).

Again referring to FIG. 2 the procedure comprises the following steps. The ICW application server (4) establishes in a database (13), that can be any kind of memory means, that there is not another call in progress for the called party number (step 1). The ICW application server (4) looks up in the ICW user record (100) in a subscriber-table. This looking up is based on the called party number, and the ICW application server (4) establishes in the ICW user record (100) that a subscription status (101) is "signed up" and activation status (102) is "online" (step 2). The ICW application server (4) creates the service detail record (200), and sets the unique id field (201) to a certain value and sets the status (207) to "online". Other fields of the service detail record (200) such as A-number (202), A-number presentation (203), B-number (204) and originally dialed number (205) should be set to the applicable values (step 3). A timer Client_activated_OK (301) is started: this timer keeps up with the time the switch (5) will wait before routing to the messaging switch (6) in order to be sure that the incoming call can be associated with a user that has activated for ICW (step 4). The ICW application server (4) requests the switch (5) to start playing a ring tone for the calling party (step 5).

A timer Wait_for_destination_number (302) is started: this is the maximum time the ICW application server (4) will wait before routing the call to messaging switch (6) (step 6). The ICW application server (4) updates the service detail record (200): a start of popup field (206) should be set to current date and time (step 7). The ICW application server (4) sends a request to the ICW Client (10), using the IP-address (106) in the ICW user record (100), to display a screen pop up on the screen of the lCW user. The IP address (106) is the IP address that is in use for the active Internet session of the ICW user. The request contains the calling party number (if available) and the available choices. The available choices may comprise routing the incoming call to the telephone number of the ICW user ('own number' option), to voice mail, to set up an VoIP call between the calling party and the called party or to neglect the incoming call. The calling party number can not be included in the request if the calling party number is restricted (step 8). Within the period defined by the Client_activated_OK timer (301), the ICW application server (4) receives an acknowledgement from the ICW client (10) that the ICW user is activated for ICW service. The acknowledgement contains the phone number and the activation code (step 9). The ICW application server (4) establishes that the activation code (105) is correct (i.e. phone number/activation code in reply match phone number (104)/activation code (105) in ICW user's record (100)) (step 10). The ICW application server (4) sends a request to the switch (5) for monitoring the call (step 11). Within the period defined by the Wait_for_destination_number timer (302), the ICW application server (4) receives the choice 'own number' from the ICW Client (10), including the activation code (step 12).

The ICW application server (4) updates the service detail record (200): choice (209) is set to "own number", and popup choice time (210) received should be set to current date&time; timeout (211) should be set to "no" (step 13). The ICW application server establishes that activation code is correct (i.e. phone number/activation code in reply match phone number/activation code in ICW user's record) (step 14). Depending on the received destination number, timer wait_for_modem_to_disconnect(303) (in case of own number) or timer SIP_Client_to_start (304) (in case of VoIP) is started (step 15). The ICW application server (4) requests the switch (5) to answer the incoming call, and to play an announcement to the calling party (step 16). In the mean time the ICW user ends the Internet connection. The ICW Application server (4) sends a 'connect' to the switch (5), upon which the switch (5) calls the ICW user's phone number and, after the ICW user answers the phone, routes the call to the ICW user's phone. The calling party number can be restricted if the original calling party number was restricted (CLIR). (step 17). The ICW application server (4) updates the service detail record (200): the start of outgoing call field (207) is set to the current date and time (step 18).

The invention claimed is:

1. A method for logging information during a call completion process in an Internet call waiting environment comprising the steps of:
    creating a service detail record comprising a plurality of parameters, wherein each of the parameters relates to management information associated with the call completion process; and
    assigning a value to each of the parameters of the service detail record.

2. The method according to claim 1, whereby the value of each parameter of the service record is based on call related information.

3. The method according to claim 2, whereby said call related information is a unique id field, an A-number, a B-number, an A-number presentation, or an originally dialed number.

4. The method according to claim 1, whereby the value of each parameter of the service record is based on information relating to the call completion process.

5. The method according to claim 4, whereby said call completion related information is a start of a pop-up, a start of an outgoing call, a status, a choice, a pop-up choice, or a time out.

6. The method according to claim 1, whereby the service detail record is created at the beginning of the call completion process.

7. The method according to claim 4, whereby a timer is started, and a value of said timer is logged in the service detail record on a point of time during the call completion process.

8. The method according to claim 1, further comprising the step of providing the service detail record to an Internet call waiting service provider, wherein the service detail record serves as a measure of performance of the Internet call waiting service.

9. A system, comprising a server, wherein the server stores and maintains an application for logging management information during a call completion process in an Internet call waiting environment, wherein the application comprises a plurality of components, wherein the plurality of components perform the following functions:
    creating a service detail record comprising a plurality of parameters, wherein each of the parameters relates to the management information associated with the call completion process; and
    assigning a value to each of the parameters of the service detail record.

10. The system according to claim 9, further comprising a user device that communicates with the server via a network.

11. The system according to claim 10, wherein the network is a mobile network.

12. The system according to claim 10, wherein the network is a fixed network.

13. The system according to claim 10, wherein the device is selected from the group consisting of a personal computer and a mobile phone.

* * * * *